United States Patent [19]

Reese et al.

[11] 4,204,808

[45] May 27, 1980

[54] FLOW CONTROL

[75] Inventors: Herbert E. Reese; Hadwen A. Clayton, both of Bartlesville, Okla.

[73] Assignee: Phillips Petroleum Company, Bartlesville, Okla.

[21] Appl. No.: 900,636

[22] Filed: Apr. 27, 1978

[51] Int. Cl.² .......................... F04B 49/00; F04B 49/06
[52] U.S. Cl. .......................................... 417/2; 417/15; 417/18; 417/45; 417/53
[58] Field of Search ........................................ 417/2-8, 417/15, 18, 19, 20, 22, 26, 28, 45, 53

[56] References Cited

U.S. PATENT DOCUMENTS

| 2,397,443 | 3/1946 | Statham et al. | 417/28 |
| 3,068,796 | 12/1962 | Pfluger et al. | 417/26 |
| 3,072,058 | 1/1963 | Christopher et al. | 417/19 |

Primary Examiner—William L. Freeh

[57] ABSTRACT

Control of a pumping station is accomplished in such a manner so as to maximize the energy efficiency of the pumping station by utilizing a variable drive pump to maintain the pipeline suction pressure seen at the input to the pumping station at an acceptable level. If the pipeline suction pressure decreases below a level which can be controlled by the variable drive pump, then a control valve located at the output of the pumping station is closed to the extent necessary to maintain the pipeline suction pressure at an acceptable level. If the pipeline suction pressure is greater than can be controlled by the variable drive pump then additional pumps are brought online to prevent overloading of the variable drive pump.

17 Claims, 1 Drawing Figure

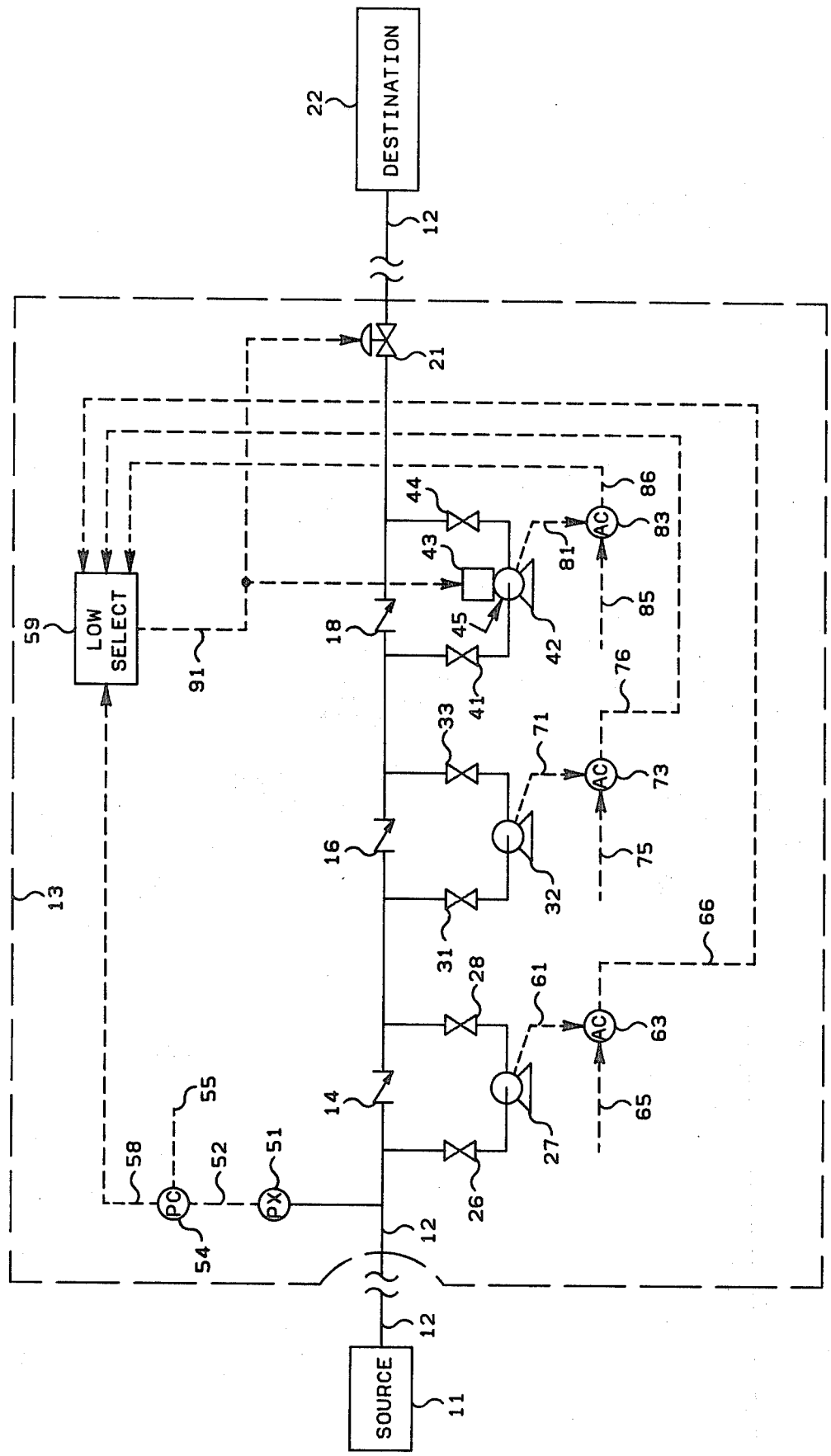

FLOW CONTROL

This invention relates to flow control. In a specific aspect this invention relates to method and apparatus for maximizing the energy efficiency of a pumping station.

The transportation of liquid and liquefied products in the petroleum industry by long distance pipelines is widespread. Because of the pressure drop along the pipeline due to friction between the liquid and the pipe, it is necessary to utilize pumping stations positioned along the line in order to boost the pressure from station to station along the line. In the operation of such stations, particularly where large pumping units are installed, it is desirable to maximize the energy efficiency of the pumping station.

In the past there has not been a concerted effort to maximize the energy efficiency of pumping stations, primarily because the fuel utilized was relatively cheap in comparison to the cost of installing the control systems and variable drive pumps required to maximize the energy efficiency of a pumping station. In the past it was common to maintain the pipeline suction pressure into the pumping station at a desired level simply by closing a control valve at the output of the pumping station, even though the closing of the control valve resulted in a lower pumping efficiency. It was also common to keep a sufficient number of pumps online to handle any predictable load even though all of the pumps utilized were not required a majority of the time. Obviously, the use of unneeded pumps would result in large, unrequired fuel expenditures which would result in a decreased energy efficiency of the pumping station.

Accordingly, it is an object of this invention to provide method and apparatus for increasing the energy efficiency of a pumping station.

In accordance with the present invention, method and apparatus are provided whereby a variable drive pumping means is utilized as the primary pump in the pumping station. The variable drive pumping means is controlled in response to a measurement of the pipeline suction pressure seen at the input to the pumping station. Thus, if the pipeline suction pressure begins to decrease the input-output speed ratio of the variable drive pumping means is increased to maintain the pipeline suction pressure at some desired level. If the input-output speed ratio of the variable drive pumping means approaches the highest possible value and the pipeline suction pressure continues to decrease, then the control valve located at the output of the pumping station is utilized to restrict the output flow and thus maintain the pipeline suction pressure input to the pumping station at a desired level. As suction pressure begins to rise, the input-output speed ratio of the variable drive pumping means is decreased. If suction pressure continues to rise after the variable drive pumping means has reached the maximum desirable input-output speed ratio, then a warning is sounded and additional direct drive pumps are put online. As the additional standby direct drive pumps are put online the pipeline suction pressure will begin to drop, thus allowing the input-output speed ratio of the variable drive pumping means to be increased. In this manner the variable drive pumping means is controlled so that it is not operating at maximum power unless such power levels are required, thus optimizing the energy efficiency of the pumping station when high pipeline suction pressures are seen.

Other objects and advantages of the invention will be apparent from the description of the invention and the appended claims as well as from the detailed description of the drawing which is a schematic diagram of a pumping station with an associated control system.

For the sake of simplicity the invention is illustrated and described in terms of a single pipeline and a pumping station which utilizes a single primary variable drive pumping means with two direct drive pumping means as standby units. The invention, however, is applicable to multiple pipeline configurations and is also applicable to pumping stations which employ different numbers of pumping means and different configurations of pumping means.

Although the invention is illustrated and described in terms of a specific pumping station, the applicability of the invention described herein extends to other pumping station configurations and also extends to different types of control system configurations which accomplish the purpose of the invention. Lines designated as signal lines in the drawings are electrical in this preferred embodiment. However, the invention is also applicable to pneumatic, mechanical, hydraulic, or other signals means for transmitting information. In almost all control systems some combination of these types of signals will be used. However, use of any other type of signal transmission, compatible with the process and equipment in use, is within the scope of the invention.

Controllers shown may utilize the various modes of control such as proportional, proportional-integral, proportional-derivative, or proportional-integral-derivative. In this preferred embodiment proportional-integral controllers are utilized. The operation of these types of controllers is well known in the art. The output control signal of a proportional-integral controller may be represented as $$S = K_1 E + K_2 \int E \, dt$$

where
S = output control signal;
E = difference between two input signals; and
$K_1$ and $K_2$ = constants.

As used in the following description of an exemplary embodiment of this invention, an input-output speed ratio of 1:1 for a variable drive pumping means indicates that the pumping means is operating as its maximum speed. An input-output speed ratio of 2.5:1 indicates that the pumping means is operating at its lowest speed. An increase in the input-output speed ratio indicates that the variable drive is changing from an input-output speed ratio of 1:1 to 2.5:1. These speed ratios are used solely as examples in the preferred embodiment of the invention. Any applicable speed ratios could be used.

Referring now to the drawing, a product, suitable for transport in a pipeline, is transported from a source 11 of the product through a pipeline 12 to a destination 22 for the product. Because the source 11 of the product and the destination 22 for the product are separated by long distance, a pumping station 13 is utilized to boost the pressure along the line. The product being transported is fed sequentially from the input of the pumping station 13 through check valve means 14, 16 and 18 and a pneumatically operated control valve 21, all of which are located in pipeline 12, to the output of the pumping station 13. The direct drive pumping means 27 is placed online by manually or automatically opening shutoff valve means 26 and 28. Check valve means 14 will automatically close. The direct drive pumping means 32 is placed online by manually or automatically opening shutoff valve means 31 and 33. Check valve means 16 will automatically close. The variable drive pumping means 45, which is made up of the pumping means 42 with its associated variable drive transmission 43, is placed online by manually or automatically opening shutoff valve means 41 and 44. Check valve means 18 will automatically close. In this preferred embodiment the variable drive transmission 43 is a variable speed synchrodrive manufactured by Philadelphia Gear Corporation.

Pressure transducer 51 measures the pipeline suction pressure at the input of the pumping station 13 and transmits a signal 52, representative of the pipeline suction pressure at the input of pumping station 13, to pressure controller 54. Pressure controller 54 is also supplied with a set point signal 55 representative of the minimum acceptable pipeline suction pressure. Pressure controller 54 compares signals 52 and 55 and transmits a signal 58, representative of a function of the difference between signals 52 and 55, to low select means 59.

Signal 61, representative of the current being drawn by direct drive pumping means 27, is provided from direct drive pumping means 27 to the current controller 63. Current controllers may also be referred to as amperage controllers and are labeled AC for amperage controller in the drawing. The current being drawn by any of the pumping means 27, 32, 45 illustrated in FIG. 1 is a function of the load on the pumping means 27, 32, 45. Current controller 63 is also provided with a set point signal 65 which is representative of the maximum desirable current which can be drawn by direct drive pumping means 27. Signal 66, representative of a function of the difference between signals 61 and 65, is transmitted from current controller 63 to low select means 59.

Signal 71, representative of the current being drawn by direct drive pumping means 32, is supplied from direct drive pumping means 32 to the current controller 73. The current controller 73 is also provided with a set point signal 75 which is representative of the maximum current which can be drawn by direct drive pumping means 32. Signal 76, representative of a function of the difference between signals 71 and 75, is transmitted from current controller 73 to low select means 59.

Signal 81, representative of the current being drawn by variable drive pumping means 45, is transmitted from variable drive pumping means 45 to current controller 83. Current controller 83 is also provided with a set point signal 85 which is representative of the maximum current which can be drawn by variable drive pumping means 45. Signal 86, representative of a function of the difference between signals 81 and 85, is transmitted from current controller 83 to low select means 59.

Low select means 59 compares signals 58, 66, 76, and 86 and selects the input signal having the lowest value to be output as control signal 91. Control signal 91 is provided to both the variable drive pumping means 45 and the pneumatically operated control valve 21.

In this preferred embodiment pressure controller 54 is a direct acting controller. Direct acting means that as the pipeline suction pressure increases the magnitude of signal 58 will increase, and as the pipeline suction pressure decreases, the magnitude of signal 58 will decrease. Current controllers 63, 73 and 83 are reverse acting controllers in this preferred embodiment. Reverse acting means that as the current drawn by the pumping means increases, the output signals 66, 76, and 86 from the current controllers will decrease, and as the current drawn by the pumping means decreases, the output signals from the current controllers will increase.

In this preferred embodiment the pneumatically operated control valve 21 closes in response to a decrease in the magnitude of control signal 91. The input-output speed ratio of the variable drive transmission 43 decreases in response to an increase in the magnitude of control signal 91.

As has been previously stated, it is an object of this invention to maximize the energy efficiency of the pumping station 13. In general, this object is accomplished by maintaining the pneumatically operated control valve 21 in a fully opened condition and allowing the variable drive pumping means 45 to control the pipeline suction pressure seen at the input to the pumping station 13. The pneumatically operated control valve 21 is partially closed only when the variable drive pumping means 45 approaches a 2.5:1 speed ratio and the pipeline suction pressure continues to drop. Control of the pumping station 13 in this manner is accomplished by using a portion of the range of control signal 91 to control the variable drive pumping means 45 and using a second portion of the range of the control signal 91 to control the pneumatically operated control valve 21. In this preferred embodiment the control signal 91 has a range of from 4–20 milliamps. The 10–20 milliamp range of control signal 91 is utilized to control the variable drive pumping means in such a manner that the variable drive pumping means will operate at an input-output speed ratio of 1:1 when control signal 91 has a value of 20 milliamps and will operate at a speed ratio of 2.5:1 when control signal 91 has a value of 10 milliamps or lower. The 4–14 milliamp range of control signal 91 is utilized to control the pneumatically operated control valve 21 by means of a current to pressure transducer, contained with pneumatically operated control valve 21, in such a manner that the pneumatically operated control valve 21 will be fully opened when control signal 91 has a valve of 14 milliamps or higher and will be fully closed when control signal 91 has a value of 4 milliamps. The overlap in the ranges of the control signal 91 utilized by the variable drive pumping means and the pneumatically operated control valve 21 is utilized to provide a smooth transition between the control of the pipeline suction pressure by the variable drive pumping means 45 and the control of the pipeline suction pressure by the pneumatically operated control valve 21.

In this preferred embodiment of the invention the variable drive pumping means 45 is a 1000 horsepower electric motor driven pump and the direct drive pumping means 27 and 32 are 500 horsepower electric motor driven pumps. Initially, only the variable drive pumping means 45 is placed online by opening shutoff valves 41 and 44. If the suction pressure seen at the input to the pumping station 13 begins to drop, then the output signal 58 from the pressure controller 54 will begin to decrease in magnitude. The output signal 58 will be selected by low select means 59 and will be provided as control signal 91 to the variable drive pumping means 45. In response to the control signal 91, which is decreasing in value in response to the decrease in the pipeline suction pressure, the input-output speed ratio of the variable drive pumping means 45 will begin to increase. If the pipeline suction pressure should continue to decrease to the point where the control signal 91 drops below 14 milliamps, then the variable drive pumping means will be approaching a 2.5:1 speed ratio and the pneumatically operated control valve 21 will begin to close. In this manner the minimum acceptable pipeline suction pressure is maintained.

If the pipeline suction pressure begins to increase, then the output signal 58 from pressure controller 54 will begin to increase. If the output signal 58 is lower than the output signal 86 from current controller 83, then the output signal 58 will be selected by the low select means 59 and will be provided as signal 91 to the variable drive pumping means 45. The input-output speed ratio of the variable drive pumping means 45 will be decreased in response to an increase in control signal 91 in such a manner that the pipeline suction pressure will be maintained at an acceptable level. However, as the input-output speed ratio of the variable drive pumping means 45 decreases, the current drawn by the variable drive pumping means 45, represented by signal 81, will increase. The increase in the magnitude of signal 81 will cause a corresponding decrease in the magnitude of the output signal 86 from the current controller 83. As the magnitude of the signal 81 approaches the magnitude of the set point signal 85, the value of the output signal 86 from the current controller 83 will be such that the output signal 86 will be selected by the low select means 59 and will be provided as control signal 91 to the variable drive pumping means 45. This prevents the variable drive pumping means 45 from drawing excessive current (being overdriven) in response to increasing pipeline suction pressure. When this condition occurs, the direct drive pumping means 32 is placed online by opening shutoff valve means 31 and 33. The direct drive pumping means 32 may be put online automatically or by an operator. When direct drive pumping means 32 comes online, the pipeline suction pressure should show a dramatic decrease. The output signal 58 from the pressure controller 54 will decrease in response to the decrease in the pipeline suction pressure and will again be selected by low select means 59 and will be provided as control signal 91 to the variable drive pumping means 45. The input-output speed ratio of the variable drive pumping means 45 will be increased in response to the decrease in the magnitude of control signal 91. This allows control of the pipeline suction pressure to be maintained by the variable drive pumping means 45, thus maximizing the energy efficiency of the pumping station 13 when pipeline suction pressure is increasing.

If direct drive pumping means 32 is online and the pipeline suction pressure again increases to a point where the variable drive pumping means 45 is operating at a 1:1 input-output speed ratio, then control signal 86 will once more be selected by the low select means 59 to protect the variable drive pumping means 45. The direct drive pumping means 27 will then be put online in a manner similar to that described in connection with direct drive pumping means 32 to again cause a decrease in pipeline suction pressure which allows the input-output speed ratio of the variable drive pumping means 45 to be increased, which will have the effect of once again allowing the variable drive pumping means 45 to control the pipeline suction pressure seen at the input of the pumping station 13.

The invention has been described in terms of its presently preferred embodiment as shown in FIG. 1. Pressure transducer 51; pressure controller 54; low select means 59; check valve means 14, 16 and 18; shutoff valve means 26, 28, 31, 33, 41 and 44; current controller 63, 73 and 83; and pneumatically operated control valve 21 are each well known commercially available control components such as are described at length in Perry's Chemical Engineer's Handbook, 4th Edition, Chapter 22, McGraw-Hill.

While the invention has been described in terms of the presently preferred embodiments, reasonable variations and modifications are possible by those skilled in the art, within the scope of the described invention and the appended claims.

That which is claimed is:

1. Apparatus comprising:
   a primary pumping means having a suction input and a discharge output;
   a valve means;
   means for connecting said discharge output to said valve means;
   means for establishing a first signal which is a function of the pressure at said suction input, said first signal having a first range and a second range, where at least a part of the first range of said first signal is outside the second range of said first signal and at least a part of the second range of said first signal is outside the first range of said first signal;
   means for varying the throughput of said primary pumping means in response to the first range of said first signal to maintain the pressure at said suction input within an acceptable range;
   means for restricting the discharge through said valve means in response to the second range of said first signal to maintain the pressure at said suction input within an acceptable range, the first range and the second range of said first signal being selected in such a manner that said valve means will be generally fully open when said first signal is in the first range; and
   means adapted to supply said first signal to said means for varying and to said means for restricting.

2. Apparatus in accordance with claim 1 wherein said means for varying the throughput of said primary pumping means is a variable speed transmission operatively connected to said primary pumping means.

3. Apparatus in accordance with claim 2 wherein said means for establishing said first signal comprises:
   means for establishing a second signal representative of the pressure at said suction input;
   means for establishing a third signal representative of the minimum acceptable pressure at said suction input; and
   means for comparing said second signal and said third signal and establishing said first signal responsive to the difference between said second and third signals.

4. Apparatus in accordance with claim 3 wherein said means for establishing said second signal comprises a pressure transducer means and said means for comparing said second signal and said third signal comprises a proportional-integral controller.

5. Apparatus comprising:
   a primary pumping means having a suction input and a discharge output;
   a valve means;
   means for connecting said discharge output to said valve means;
   means for establishing a first signal which is a function of the pressure at said suction input, said first signal having a first range and a second range, where at least a part of the first range of said first signal is outside the second range of said first signal and at least a part of the second range of said first signal is outside the first range of said first signal;

means for varying the throughput of said primary pumping means in response to the first range of said first signal to maintain the pressure at said sunction input within an acceptable range;

means for restricting the discharge through said valve means in response to the second range of said first signal to maintain the pressure at said suction input within an acceptable range, the first range and the second range of said first signal being selected in such a manner that said valve means will be generally fully open when said first signal is in the first range;

means adapted to supply said first signal to said means for varying and to said means for restricting at least one secondary pumping means;

means for establishing a second signal which is a function of the load on said primary pumping means, said second signal having a first range and a second range, the first range of said second signal corresponding to the first range of said first signal, the second range of said second signal corresponding to the second range of said first signal, where at least a part of the first range of said second signal is outside the second range of said second signal and at least a part of said second range of the second signal is outside said first range of said second signal;

means for supplying said second signal to said means adapted to supply said first signal to said means for varying and said means for restricting, said means adapted to supply said first signal to said means for varying and said means for restricting being adapted to select said second signal to be supplied to said means for varying and said means for restricting, in place of the first range of said first signal, if the load on said primary pumping means approaches the maximum allowable load for said primary pumping means, the first range of said second signal being adapted to hold the throughput of said primary pumping means constant or at a reduced level to prevent overloading of said primary pumping means, and the second range of said signal being adapted to close said valve means, at least partially, to restrict the throughput of said primary pumping means to prevent overloading of said primary pumping means; and means for placing said at least one secondary pumping means online when said second signal is being supplied to said means for varying and said means for restricting to reduce the throughput requirements of said primary pumping means by reducing the pressure at said suction input so that said primary pumping means and said valve means are returned to the control of said first signal.

6. Apparatus in accordance with claim 5 wherein said means for varying the throughput of said primary pumping means is a variable speed transmission operatively connected to said primary pumping means and said at least one secondary pumping means is a direct drive pumping means.

7. Apparatus in accordance with claim 6 wherein said means for establishing said first signal comprises:

means for establishing a third signal representative of the pressure at said suction input;

means for establishing a fourth signal representative of the minimum acceptable pressure at said suction input; and means for comparing said third signal and said fourth signal and establishing said first signal responsive to the difference between said third and fourth signals.

8. Apparatus in accordance with claim 7 wherein said means for establishing said third signal comprises a pressure transducer means and said means for comparing said third signal and said fourth signal comprises a proportional-integral controller means.

9. Apparatus in accordance with claim 8 wherein said means for establishing said second signal comprises:

means for establishing a fifth signal representative of the load on said primary pumping means;

means for establishing a sixth signal representative of the maximum allowable load for said primary pumping means; and means for comparing said fifth signal and said sixth signal and establishing said second signal responsive to the difference between said fifth signal and said sixth signal.

10. Apparatus in accordance with claim 9 wherein said means for comparing said fifth signal and said sixth signal comprises a proportional-integral controller means.

11. Apparatus in accordance with claim 10 wherein said means for establishing said first signal comprises a direct acting controller, said means for establishing said second signal comprises a reverse acting controller, said means adapted to supply said first signal to said primary pumping means and said valve means comprises a low select means, said valve means opens with increasing signal levels, the input-output speed ratio of said variable drive transmission decreases in response to increasing signal levels, and wherein said first range of said first signal represents higher signal levels than said second range of said first signal.

12. A method for increasing the energy efficiency of a pumping station comprising the steps of:

establishing a first signal which is a function of the pressure at the suction input of said pumping station, said first signal having a first range and a second range, where at least a part of the first range of said first signal is outside the second range of said first signal and at least a part of the second range of said first signal is outside the first range of said first signal;

varying the throughput of said pumping station in response to said first range of said first signal to maintain the pressure at said suction input of said pumping station at an acceptable level;

restricting the throughput of said pumping station in response to the second range of said first signal to maintain the pressure at said suction input of said pumping station at an acceptable level, the first range and the second range of said first signal being selected in such a manner that the throughput of said pumping station will not be restricted when said first signal is in said first range.

13. A method in accordance with claim 12 wherein said step of establishing said first signal comprises:

establishing a second signal representative of the pressure at said suction input of said pumping station;

establishing a third signal representative of the minimum acceptable pressure at said suction input of said pumping station; and comparing said second signal and said third signal and establishing said first signal responsive to the difference between said second and third signals.

14. A method for increasing the energy efficiency of a pumping station comprising the steps of:

establishing a first signal which is a function of the pressure at the suction input of said pumping station, said first signal having a first range and a second range, where at least a part of the first range of said first signal is outside the second range of said first signal and at least a part of the second range of said first signal is outside the first range of said first signal;

varying the throughput of said pumping station in response to said first range of said first signal to maintain the pressure at said suction input of said pumping station at an acceptable level;

restricting the throughput of said pumping station in response to the second range of said first signal to maintain the pressure at said suction input of said pumping station at an acceptable level, the first range and the second range of said first signal being selected in such a manner that the throughput of said pumping station will not be restricted when said first signal is in said first range;

establishing a second signal which is a function of the load on a primary pumping means in said pumping station, said second signal having a first range and a second range, the first range of said second signal corresponding to the first range of said first signal, the second range of said second signal corresponding to the second range of said first signal, where at least a part of the first range of said second signal is outside the second range of said second signal and at least a part of said second range of said second signal is outside the first range of said second signal;

varying the throughput of said primary pumping means in response to the first range of said second signal, in place of the first range of said first signal, if the load on said primary pumping means approaches the maximum allowable load for said primary pumping means, the first range of said second signal being adapted to hold the throughput of said primary pumping means constant or at a reduced level to prevent overloading of said primary pumping means, the second range of said second signal being adapted to at least partially restrict the throughput through said pumping station to prevent overloading of said primary pumping means; and placing at least one secondary pumping means in said pumping station online when aid second signal has been selected in place of said first signal, to reduce the throughput requirements of said primary pumping means by reducing the pressure at said suction input so that control is returned to said first signal.

15. A method in accordance with claim 14 wherein said step of establishing said first signal comprises:

establishing a third signal representative of the pressure at said suction input;

establishing a fourth signal representative of the minimum acceptable pressure at said suction input; and comparing said third signal and said fourth signal and establishing said first signal responsive to the difference between said third and fourth signals.

16. A method in accordance with claim 15 wherein said step of establishing said second signal comprises:

establishing a fifth signal representative of the load on said primary pumping means;

establishing a sixth signal representative of the maximum allowable load for said primary pumping means; and comparing said fifth signal and said sixth signal and establishing said second signal responsive to the difference between said fifth signal and sixth signals.

17. A method in accordance with claim 16 wherein said first signal level increases in response to an increase in the pressure at said suction input, said second signal level decreases in response to an increase in the load on said primary pumping means, the throughput of said pumping station is restricted in response to a decrease in said first signal, the input-output speed ratio of the variable drive transmission associated with said primary pumping means is decreased in response to an increase in signal level, the first signal level of said first signal is representative of higher signal levels than the second range of said first signal, and the first signal range of said second signal if representative of higher signal levels than the second signal range of said second signal.

* * * * *